US010486586B1

(12) United States Patent
Ghannam et al.

(10) Patent No.: US 10,486,586 B1
(45) Date of Patent: Nov. 26, 2019

(54) CONTROL OF VEHICLE HEADLIGHTS BASED ON WEATHER CONDITIONS

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/105,475

(22) Filed: Aug. 20, 2018

(51) Int. Cl.
*B60Q 1/14* (2006.01)
*B60Q 1/08* (2006.01)
*B60Q 1/24* (2006.01)
*B60Q 1/22* (2006.01)

(52) U.S. Cl.
CPC ............ *B60Q 1/085* (2013.01); *B60Q 1/143* (2013.01); *B60Q 1/1423* (2013.01); *B60Q 1/1461* (2013.01); *B60Q 1/22* (2013.01); *B60Q 1/24* (2013.01); *B60Q 2300/23* (2013.01); *B60Q 2300/312* (2013.01); *B60Q 2300/314* (2013.01); *B60Q 2300/42* (2013.01); *B60Q 2300/45* (2013.01)

(58) Field of Classification Search
CPC ............ B60Q 1/1423; B60Q 2300/312; B60Q 2300/054; B60Q 1/04; B60Q 2300/314; B60Q 1/08; B60Q 1/20; B60S 1/0844; F21V 23/0471; F21V 23/0464; H05B 37/02; H05B 37/0218; H05B 37/0227; H05B 37/0272
See application file for complete search history.

(56) References Cited

U.S. PATENT DOCUMENTS

| 6,343,869 | B1 | 2/2002 | Kobayashi |
| 8,552,648 | B2 * | 10/2013 | Hayakawa ............. B60Q 1/143 315/82 |
| 8,605,154 | B2 * | 12/2013 | Datta ..................... B60Q 1/143 348/148 |
| 9,079,531 | B2 * | 7/2015 | Refior ................. H05B 33/0854 |
| 9,110,196 | B2 * | 8/2015 | Urmson ................... G01W 1/02 |
| 9,187,063 | B2 * | 11/2015 | Hirai ..................... B60S 1/0844 |
| 9,285,230 | B1 * | 3/2016 | Silver .................... G01C 21/26 |
| 9,344,691 | B2 * | 5/2016 | Hirai ..................... G01N 21/958 |
| 9,415,719 | B2 * | 8/2016 | Hayakawa ............. B60Q 1/143 |
| 9,469,416 | B2 * | 10/2016 | Barnes ................... B64D 47/08 |
| 9,527,434 | B2 * | 12/2016 | Nakashima ............. B60Q 1/20 |

(Continued)

FOREIGN PATENT DOCUMENTS

KR   20050003651 A   1/2005

*Primary Examiner* — Vibol Tan
(74) *Attorney, Agent, or Firm* — Frank Lollo; Eversheds Sutherland (US) LLP

(57) ABSTRACT

Method and apparatus are disclosed for control of vehicle headlights based on weather conditions. An example vehicle includes headlamps including low-beam lamps and high-beam lamps. The example vehicle also includes a light sensor, a camera, and a controller. The controller is to set the low-beam lamps in active mode when the light sensor detects low ambient light, monitor for precipitation in the low ambient light via the camera, identify an angle-of-incidence (AOI) between the precipitation and light emitted by the headlamps, and control the high-beam lamps based on the AOI.

18 Claims, 7 Drawing Sheets

(56) References Cited

U.S. PATENT DOCUMENTS

| | | | |
|---|---|---|---|
| 9,651,390 B1 | 5/2017 | Thompson et al. | |
| 9,783,320 B2* | 10/2017 | Barnes | B64D 47/08 |
| 10,005,384 B2* | 6/2018 | Canonne | B60Q 1/04 |
| 10,124,716 B1* | 11/2018 | Gauthier | B60Q 1/143 |
| 10,173,582 B2* | 1/2019 | Salter | B60Q 1/268 |
| 2003/0223220 A1* | 12/2003 | Okishima | F21S 41/657 |
| | | | 362/43 |
| 2011/0012511 A1* | 1/2011 | Watanabe | B60Q 1/085 |
| | | | 315/82 |
| 2015/0262492 A1* | 9/2015 | Barnes | B64D 47/08 |
| | | | 701/301 |
| 2017/0217359 A1* | 8/2017 | Huettner | B60Q 1/1423 |
| 2017/0291600 A1* | 10/2017 | Styles | B60W 30/00 |

* cited by examiner

CONTROL OF VEHICLE HEADLIGHTS BASED ON WEATHER CONDITIONS

TECHNICAL FIELD

The present disclosure generally relates to vehicle headlights and, more specifically, to control of vehicle headlights based on weather conditions.

BACKGROUND

Generally, vehicles include headlamps to illuminate areas in front of the vehicles. Typically, a vehicle includes low-beam headlamps that are utilized to illuminate a side of a road along which the vehicle is travelling. Additionally, a vehicle typically includes high-beam headlamps that are utilized to illuminate a greater portion of the road (e.g., illuminates the side of the road along which the vehicle travels and a side of the road along which on-coming traffic travels). Some regulations instruct against use of high-beam headlamps when a vehicle is approaching a pedestrian and/or another vehicle to prevent the high-beam headlamps from reducing visibility of the pedestrian and/or a driver of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for control of vehicle headlights based on weather conditions. An example disclosed vehicle includes headlamps including low-beam lamps and high-beam lamps. The example disclosed vehicle also includes a light sensor, a camera, and a controller. The controller is to set the low-beam lamps in active mode when the light sensor detects low ambient light, monitor for precipitation in the low ambient light via the camera, identify an angle-of-incidence (AOI) between the precipitation and light emitted by the headlamps, and control the high-beam lamps based on the AOI.

In some examples, the controller is to monitor for smoke in the low ambient light via the camera and identify the AOI between the smoke and the light emitted by the headlamps. In some examples, the controller utilizes image recognition to identify the AOI based on an image captured by the camera.

In some examples, to control the high-beam lamps based on the AOI, the controller is to set the low-beam lamps in inactive mode responsive to detecting a precipitation flow-stream that is perpendicular or parallel to the light emitted by the headlamps. In some examples, to control the high-beam lamps based on the AOI, the controller is to adjust the high-beam lamps to emit high beams in a direction of a precipitation flow-stream that corresponds with cross wind. In some examples, the controller is to identify a clear line-of-sight within the precipitation based on an image captured by the camera and cause the high-beam lamps to emit high beams in a direction of the clear line-of-sight.

In some examples, the controller is to detect at least one of a nearby pedestrian and an oncoming vehicle based on at least one of the camera and a proximity sensor and set the low-beam lamps in inactive mode responsive to detecting the at least one of the nearby pedestrian and the oncoming vehicle.

In some examples, the controller is to detect a line-of-sight of a of a vehicle operator and control the high-beam lamps based on the line-of-sight of the vehicle operator. In some such examples, the controller is configured to detect the line-of-sight via at least one of an interior camera, a seat position sensor, and a restraint control module.

In some examples, each of the high-beam lamps includes a plurality of LEDs and the controller adjusts which of the plurality of LEDs are active to adjust a direction in which the high-beam lamps emit high beams. In some examples, each of the high-beam lamps includes a rotatable frame and the controller rotates the rotatable frame to adjust a direction in which the high-beam lamps emit high beams.

An example disclosed vehicle includes headlamps including low-beam lamps and high-beam lamps. The example disclosed vehicle also includes a communication module and a controller. The controller is to set the low-beam lamps in active mode responsive to detecting low ambient light via the communication module, monitor for precipitation in the low ambient light via the communication module, identify an angle-of-incidence (AOI) between the precipitation and light emitted by the headlamps, and control the high-beam lamps based on the AOI.

In some examples, the communication module includes a dedicated short-range communication module. In some examples, the controller is to identify the AOI between the precipitation and the light emitted by the headlamps based on a direction-of-travel and a wind direction.

Some examples further include a GPS receiver to identify a current vehicle location. In some such examples, the communication module is to obtain weather conditions for the current vehicle location from a remote weather service. Further, in some such examples, the controller is to identify a predicted travel route based at least partially on the current vehicle location and the communication module is to obtain weather conditions for the predicted travel route from the remote weather service.

In some examples, to control the high-beam lamps based on the AOI, the controller is to set the low-beam lamps in inactive mode responsive to detecting a precipitation flow-stream that is perpendicular or parallel to the light emitted by the headlamps. In some examples, to control the high-beam lamps based on the AOI, the controller is to adjust the high-beam lamps to emit high beams in a direction of a precipitation flow-stream that corresponds with cross wind.

An example disclosed method includes detecting, via a light sensor, an ambient light level of a vehicle and setting low-beam lamps of headlamps in active mode when the light sensor detects low ambient light. The example disclosed method also includes monitoring, via a processor, for precipitation in the low ambient light and identifying, via the processor, an angle-of-incidence (AOI) between the precipitation and light emitted by the headlamps. The example disclosed method also includes controlling high-beam lamps of the headlamps based on the AOI.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
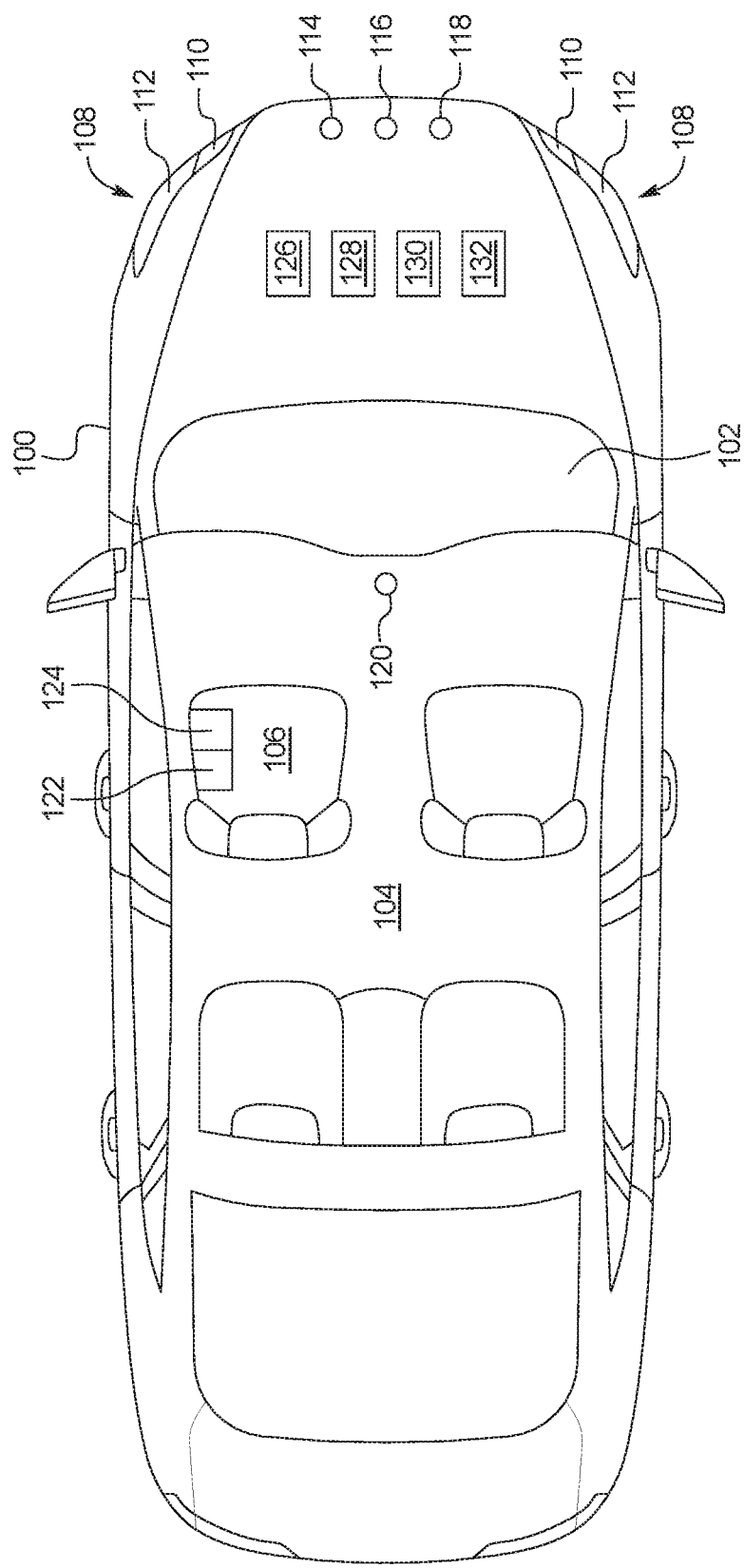
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include headlamps to illuminate areas in front of the vehicles. Typically, a vehicle includes low-beam headlamps that are utilized to illuminate a side of a road along which the vehicle is travelling. Additionally, a vehicle typically includes high-beam headlamps that are utilized to illuminate a greater portion of the road (e.g., illuminates the side of the road along which the vehicle travels and a side of the road along which on-coming traffic travels). In some instances, high-beam light directed at a pedestrian and/or a driver of another vehicle potentially may reduce visibility of the pedestrian and/or other driver. In turn, some regulations instruct against use of high-beam headlamps when a vehicle is approaching a pedestrian and/or another vehicle. Further, in some instances, precipitation and/or other conditions (e.g., rain, snow, smoke, fog, etc.) cause high-beam light to bounce away from a driver's eye (as opposed to being diffused and reflected back to the driver's eye by a road in dry conditions), thereby creating glare that potentially makes it more difficult for the driver to see the road.

Example methods and apparatus disclosed herein autonomously adjust high-beam lamps of a vehicle based on an ambient light level and a surrounding weather condition to increase visibility of an operator of the vehicle. Examples disclosed herein include a system for controlling high-beams of a vehicle. The system detects whether ambient light surrounding the vehicle is low. If the ambient light level is low, the system detects whether a visibility-reducing weather condition (e.g., dust, sand, precipitation such as rain, snow, fog, etc.) is present within the surrounding area of the vehicle. If the system detects a visibility-reducing weather condition, the system (1) identifies flow-streams of the weather condition and (2) adjusts an angle-of-incidence of the high-beams based on the flow-streams to increase visibility within the weather condition. For example, the system (1) deactivates the high-beams upon detecting that the flow-streams are perpendicular and/or parallel to the high-beams or (2) adjusts a direction of the high-beams upon detecting that the flow-streams corresponds with a cross-wind relative to the vehicle. Further, the system deactivates the high-beams upon detecting nearby pedestrian(s) and/or oncoming vehicle(s).

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a windshield 102 and a cabin 104 at least partially defined by the windshield 102. For example, the windshield 102 is formed of laminated or safety glass to prevent the windshield 102 from shattering during a collision event. The cabin 104 includes a driver's seat 106 in which an operator (e.g., a driver) of the vehicle 100 is to sit. The windshield 102 enables the operator seated in the driver's seat 106 to observe a surrounding area in front and/or to the side of the vehicle 100.

As illustrated in FIG. 1, the vehicle 100 also includes headlamps 108. Further, each of the headlamps 108 includes a low-beam lamp 110 and a high-beam lamp 112. For example, each of the low-beam lamps 110 and the high-beam lamps 112 includes a plurality of light-emitting diodes (LEDs). In some examples, the LEDs of the low-beam lamps 110 and the high-beam lamps 112 are configured to be fully illuminated, fully dimmed, and/or partially illuminated. For example, the headlamps 108 produce a low-beam setting when the low-beam lamps 110 are fully illuminated and the high-beam lamps 112 are fully dimmed. Further, the headlamps 108 produce a high-beam setting when the high-beam lamps 112 are fully illuminated. In some examples, the orientation of one or more of the LEDs of the high-beam lamps 112 is adjustable to enable the high-beam lamps 112 to adjustably emit high beams in different directions.

Further, the vehicle 100 of the illustrated example includes an exterior camera 114, a proximity sensor 116, and a light sensor 118. The exterior camera 114 is configured to capture image(s) and/or video of an exterior area surrounding the vehicle 100. For example, the exterior camera 114 is a front-view camera that captures image(s) and/or video of an area in front and/or to the side of the vehicle 100. The proximity sensor 116 is configured to collect data that enables the detection, location, and/or identification of object(s) near the vehicle 100. The proximity sensor 116 includes a radar sensor, a lidar sensor, an ultrasonic sensor, and/or any other sensor that is configured to collect data utilized to detect, utilize, and/or identify a nearby object. For example, a radar sensor detects and locates an object via radio waves, a lidar sensor detects and locates an object via lasers, and an ultrasonic sensor detects and locates the object via ultrasound waves. The light sensor 118 is configured to measure an ambient light level of the ambient light surrounding the vehicle 100. For example, the light sensor 118 detects a low ambient light level when it is dark out (e.g., at night, in a tunnel, during inclement weather conditions, etc.) and/or a high ambient light level when it is light out (e.g., during the daytime).

In the illustrated example, the vehicle of the illustrated example includes an interior camera 120, a seat position sensor 122, and a restraint control module 124. The interior camera 120 captures image(s) and/or video of the cabin 104 of the vehicle 100. For example, the interior camera 120 captures image(s) and/or video of (1) the driver's seat 106 and/or (2) an operator seated in the driver's seat 106 to facilitate identification of (a) a position and/or recline angle of the driver's seat 106, (b) a position of the operator, and/or (c) a line-of-sight of the operator. Further, the seat position sensor 122 is configured to detect a position and/or recline angle of the driver's seat to facilitate identification of a position and/or line-of-sight of the operator.

The restraint control module 124 (also referred to as an RCM) is an electronic control unit (also referred to as an ECU) of the vehicle 100. ECUs monitor and control the subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. The ECUs are configured to communicate and exchange information via a vehicle data bus (e.g., a vehicle data bus 508 of FIG. 5). For example, the ECUs may communicate properties (e.g., status of the ECUs, sensor readings, control state, error and diagnostic codes, etc.) to and/or receive requests from each other. The vehicle 100 may have dozens of ECUs that are positioned in various locations around the vehicle 100 and are communicatively coupled by a vehicle data bus.

The restraint control module 124 of the illustrated example is configured to (1) detect when the vehicle 100 is involved in a collision and/or hard-braking event and (2) deploy device(s) to restrain position(s) of occupant(s) within the vehicle 100 upon detecting such an event. For example, upon detecting that the vehicle 100 is involved in a collision and/or hard-braking event, the restraint control module 124 deploys airbag(s), activates seat belt pretensioner(s), and/or activates webclamp(s) to restrain the occupant(s) within the cabin 104 of the vehicle 100. In some examples, the restraint control module 124 includes an accelerometer and/or other impact sensor(s) to monitor for a collision and/or hard-braking event. For example, an accelerometer measures accelerations and/or vibrations of the vehicle 100 to monitor for an occurrence, location, and/or severity of a collision and/or hard-braking event. Further, the restraint control module 124 of the illustrated example is configured to monitor the position and/or recline angle of the driver's seat to facilitate identification of a position and/or line-of-sight of the operator.

In the illustrated example, the vehicle also includes a global position system (GPS) receiver 126, a communication module 128, and another communication module 130. For example, the GPS receiver 126 receives a signal from a global positioning system to determine a location of the vehicle 100.

The communication module 128 of the illustrated example is a dedicated short-range communication (DSRC) module that includes antenna(s), radio(s) and software to broadcast messages and to establish connections between the vehicle 100 and other vehicle(s), infrastructure-based module(s), and/or mobile device-based module(s). That is, the communication module 128 is configured for vehicle-to-vehicle (V2V) communication, vehicle-to-infrastructure (V2I) communication, and/or vehicle-to-everything (V2X) communication. DSRC systems may be installed on vehicles and along roadsides on infrastructure. DSRC systems incorporating roadside infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The communication module 130 of the illustrated example includes wired or wireless network interfaces to enable communication with external network(s) and/or other device(s). The external network(s) may be a public network, such as the Internet; a private network, such as an intranet; or combinations thereof, and may utilize a variety of networking protocols now available or later developed including, but not limited to, TCP/IP-based networking protocols. The communication module 130 also includes hardware (e.g., processors, memory, storage, antenna, etc.) and software to control the wired or wireless network interfaces. For example, the communication module 130 includes one or more communication controllers for cellular networks, such as Global System for Mobile Communications (GSM), Universal Mobile Telecommunications System (UMTS), Long Term Evolution (LTE), Code Division Multiple Access (CDMA). In some examples, the communication module 130 includes a wireless personal area network (WPAN) module that is configured to wirelessly communicate with a mobile device via short-range wireless communication protocol(s). For example, the communication module 130 implements the Bluetooth® and/or Bluetooth® Low Energy (BLE) protocols. Further, in some examples, the communication module 130 is configured to wirelessly communicate via Wi-Fi®, Near Field Communication (NFC), ultra-wide band (UWB) communication, ultra-high frequency (UHF) communication, low frequency (LF) communication, and/or any other communication protocol that enables the communication module 130 to communicatively couple to a mobile device of an occupant of the vehicle 100.

As illustrated in FIG. 1, the vehicle 100 includes a headlamp controller 132 that is configured to control operation of the headlamps 108. For example, the headlamp controller 132 includes hardware (e.g., a processor, memory, storage, etc.) and software to control operation of the headlamps 108 of the vehicle 100.

In operation, the headlamp controller 132 detects an ambient light level for the vehicle 100. For example, the headlamp controller 132 detects the ambient light level based on (1) data collected by the light sensor 118, (2) image(s) and/or video collected by the exterior camera 114, (3) V2V, V2I, and/or V2X communication collected by the communication module 128, and/or (4) information collected by the communication module 130 and/or stored in an in-vehicle database that identifies the ambient light level based on a location, date, and time-of-day. Further, the headlamp controller 132 determines whether there is low ambient light by comparing the measured ambient light level to a predetermined threshold. For example, the headlamp controller 132 determines that there is low ambient light when the measured ambient light level is less than a predetermined threshold. In response to the headlamp controller 132 determining that there is a low ambient light, the headlamp controller 132 sets the low-beam lamps 110 in active mode (e.g., the headlamp controller 132 turns on the low-beam lamps 110) to increase visibility of the operator of the vehicle 100.

Further, the headlamp controller 132 identifies the weather conditions for the vehicle location when the vehicle is traveling through the low ambient light. For example, the headlamp controller 132 monitors for precipitation (e.g rain, snow, fog, freezing rain, hail, etc.), smoke, dust, and/or other particulates that potentially reduce visibility of the vehicle operator. In the illustrated example, the headlamp controller 132 is configured to identify precipitation and/or air particulates based on (1) image(s) and/or video captured by the exterior camera 114, (2) data collected from vehicle sensor(s), (3) data collected from a remote weather service via the communication module 130, (4) data collected from nearby vehicle(s), infrastructure module(s), mobile device(s) via the communication module 128, (5) a current vehicle location determined via the GPS receiver 126, (6) a predicted travel path determined by the headlamp controller 132, and/or (7) any other collected data. For example, the headlamp controller 132 is configured to collect the weather conditions from a remote weather service for the current location of the vehicle 100 for a selected and/or predicted travel path of the vehicle 100. In some examples, the headlamp controller 132 determines a predicted travel route based on a current location of the vehicle 100, a time of day, a day of the week, route history of the vehicle 100, route history of the operator of the vehicle 100, etc.

Upon detecting precipitation and/or other visibility-reducing air particulates, the headlamp controller 132 identifies an angle-of-incidence between (1) the precipitation and/or the air particulates and (2) the light emitted by the headlamps 108. For example, the headlamp controller 132 utilizes image recognition software to identify the angle-of-incidence based on the image(s) and/or video captured by the exterior camera 114. Additionally or alternatively, headlamp controller 132 determines the angle-of-incidence based on the direction of travel of the vehicle 100 and a wind direction. For example, the GPS receiver 126 enables the headlamp controller 132 to identify the direction of travel of the vehicle 100. Further, the headlamp controller 132 identifies the wind direction based on weather data collected from a remote weather server, nearby vehicle(s), nearby infrastructure module(s), nearby mobile device(s), etc.

Upon identifying the angle-of-incidence, the headlamp controller 132 controls the high-beam lamps 112 based on the angle-of-incidence to increase the visibility for the operator of the vehicle 100 in low light conditions. For example, in response to detecting a vertical flow-stream of precipitation and/or flow-stream that is parallel to the direction of travel of the vehicle 100, the headlamp controller 132 sets the high-beam lamps 112 in an inactive mode (e.g., turns off the high-beam lamps 112) to prevent the high-beams from reducing visibility of the vehicle operator. In response to detecting a cross-wind flow-stream of precipitation, the headlamp controller 132 (1) sets the high-beam lamps 112 in an active mode (e.g., turns on the high-beam lamps 112) and (2) rotates a direction in which the high-beam lamps 112 emit light to increase visibility for the vehicle operator. For example, the headlamp controller 132 detects a direction of a flow-stream of precipitation based on image(s) and/or video captured by the exterior camera 114. Additionally or alternatively, the headlamp controller 132 detects the direction of the flow-stream based on a direction of travel of the vehicle (e.g., as determined by the GPS receiver 126) and weather data that includes a wind direction of precipitation for the vehicle location (e.g., collected from a remote weather server and/or via V2X communication).

Further, in response to detecting a clear line-of-sight through the precipitation (e.g., fog) and/or a cloud of other air particulates (e.g., smoke), the headlamp controller 132 adjusts the high-beam lamps 112 to emit the high beams 304 in the direction of the clear line-of-sight to increase visibility for the vehicle operator. For example, the headlamp controller 132 identifies a clear line-of-sight based on (1) image(s) and/or video captured by the exterior camera 114 and/or (2) a detected position of the operator. In some examples, the headlamp controller 132 identifies the position of the vehicle operator based on (1) image(s) and/or video captured by the interior camera 120, (2) data collected by the seat position sensor 122, and/or data collected by the restraint control module 124.

Additionally or alternatively, the headlamp controller 132 determines monitors for nearby pedestrian(s) and/or oncoming vehicle(s). For example, the headlamp controller 132 detects the presence of nearby pedestrian(s) and/or oncoming vehicle(s) based on (1) data collected by the proximity sensor 116, (2) image(s) and/or video collected by the exterior camera 114, and/or (3) V2V, V2I, and/or V2X communication collected by the communication module 128. Upon detecting a nearby pedestrian and/or an oncoming vehicle, the headlamp controller 132 sets the high-beam lamps 112 in inactive mode (e.g., the headlamp controller 132 turns off the high-beam lamps 112) to prevent the high-beam lamps 112 of the vehicle from reducing the visibility of the nearby pedestrian and/or operator of the oncoming vehicle.

Figure 2:
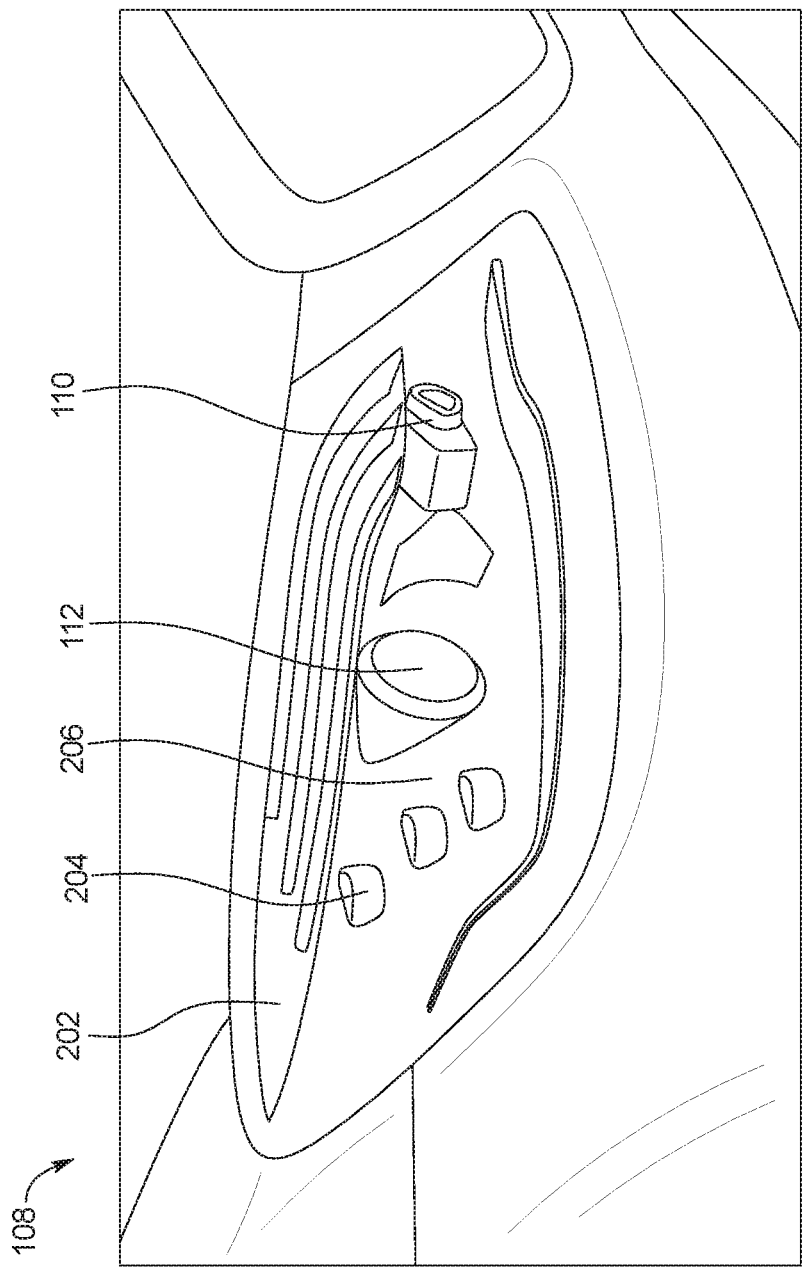
FIG. 2 illustrates an example headlamp of the vehicle of FIG. 1.

FIG. 2 illustrates one of the headlamps 108 of the vehicle 100. In the illustrated example, the headlamp 108 includes a housing 202. Further, the headlamp 108 includes the low-beam lamp 110, the high-beam lamp 112, and turn-signal lamps 204 that are positioned within the housing 202. The low-beam lamp 110 is configured to emit a low beam, the high-beam lamp 112 is configured to emit a high beam, and the turn-signal lamps 204 are configured to emit a turn signal.

In the illustrated example, the headlamp 108 includes a rotatable frame 206 positioned within the housing 202. The rotatable frame 206 is configured to rotate vertically and/or laterally within the housing 202 of the headlamp 108. Further, the high-beam lamp 112 is fixed to the rotatable frame 206 such that the high-beam lamp 112 rotates when the rotatable frame 206 rotates. For example, the headlamp controller 132 of the vehicle 100 causes the rotatable frame 206 to rotate the high-beam lamp 112 and, in turn, adjust a direction which the high-beam lamp 112 emits the high beam.

Additionally or alternatively, each of the low-beam lamp 110, the high-beam lamp 112, and/or the turn-signal lamps 204 includes a plurality of LEDs that are configured to be fully illuminated, fully dimmed, and/or partially illuminated. In some examples, the LEDs are configured to be controlled by the headlamp controller 132 individually and/or in clusters. In some examples, the headlamp controller 132 adjusts (1) which LEDs are active and/or (2) an illumination of one or more the LEDs of the high-beam lamp 112 to adjust the direction in which the high-beam lamp 112 emits the high beam. For example, the headlamp controller 132 is configured to cause (1) upper LEDs to emit more light than lower LEDs to cause the high-beam lamp 112 to emit the high beam in an upward direction, (2) lower LEDs to emit more light than upper LEDs to cause the high-beam lamp 112 to emit the high beam in a downward direction, (3) leftward LEDs to emit more light than rightward LEDs to cause the high-beam lamp 112 to emit the high beam in a leftward direction, and/or (4) rightward LEDs to emit more light than leftward LEDs to cause the high-beam lamp 112 to emit the high beam in a rightward direction.

Figure 3A:
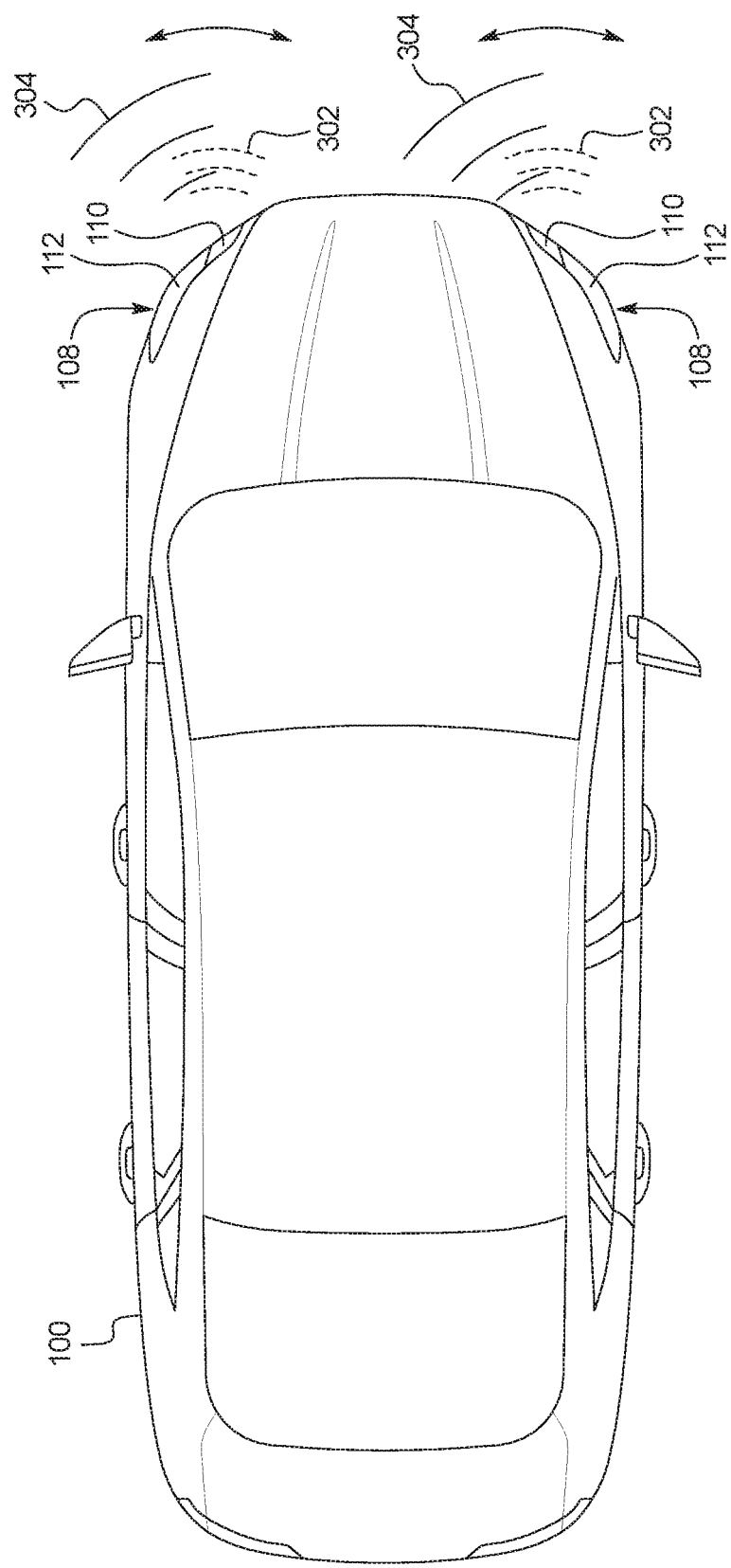
FIGS. 3A-3B illustrate example adjustments of high-beam lamps of the vehicle of FIG. 1.
Figure 3B:
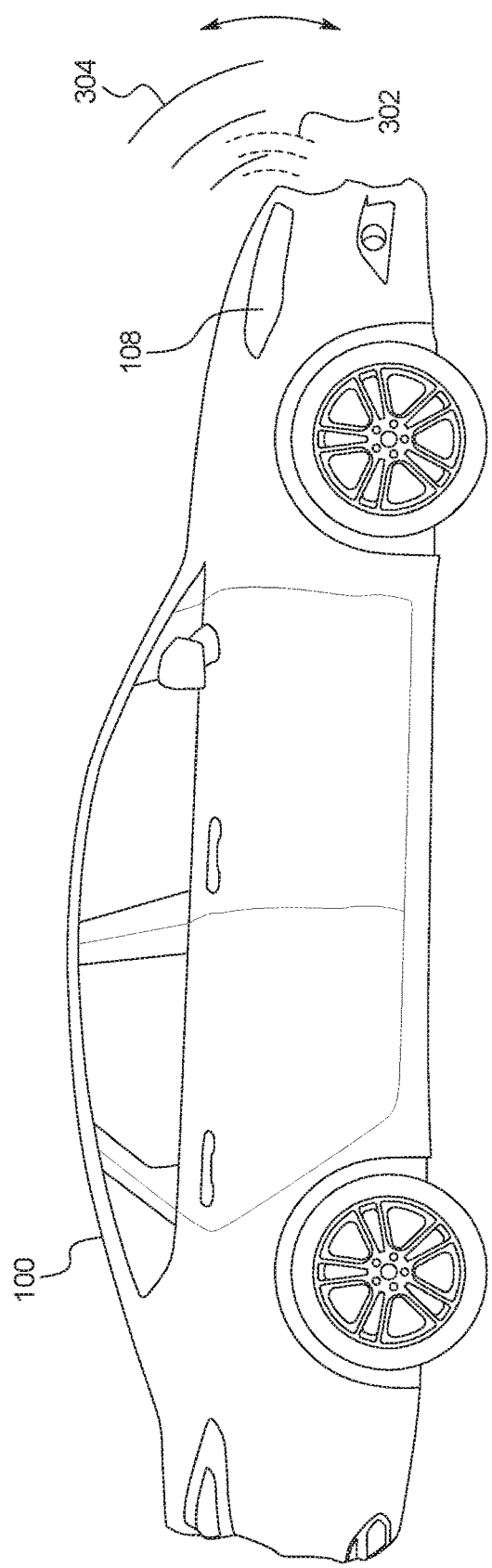

FIGS. 3A-3B illustrate the headlamps 108 of the vehicle 100 emitting light to illuminate an area in front of the vehicle 100. In the illustrated example, the low-beam lamps 110 of the headlamps 108 emit low beams 302, and the high-beam lamps 112 of the headlamps emit high beams 304. For example, the low-beam lamps 110 emit the low beams 302 when set in an active mode and do not emit the low beams 302 when set in an inactive mode. Similarly, the high-beam lamps 112 emit the high beams 304 when set in an active mode and do not emit the high beams 304 when set in an inactive mode.

As illustrated in FIGS. 3A-3B, the high-beam lamps 112 are configured to adjust a direction in which the high beams 304 are emitted. More specifically, FIG. 3A depicts that the high-beam lamps 112 are configured to laterally adjust the direction in which the high beams 304 are emitted. Further, FIG. 3B depicts that the high-beam lamps 112 are configured to vertically adjust the direction in which the high beams 304 are emitted. For example, the headlamp controller 132 causes the high-beam lamps to laterally and/or vertically adjust the direction in which the high-beam lamps 112 emit the high beams 304 based on detected weather conditions.

Figure 4A:
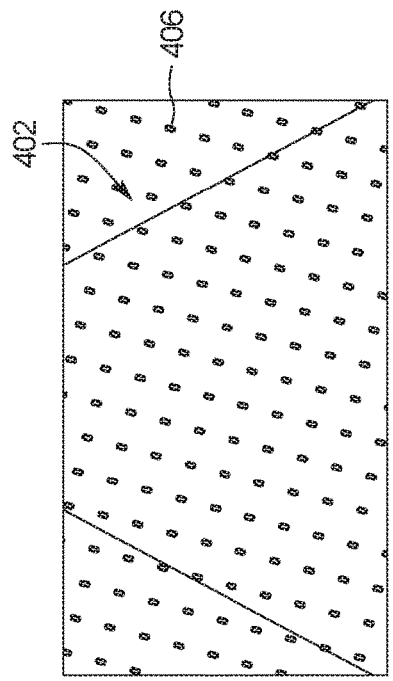
FIG. 4A-4D depict example weather conditions in which the vehicle of FIG. 1 is configured to travel.
Figure 4B:
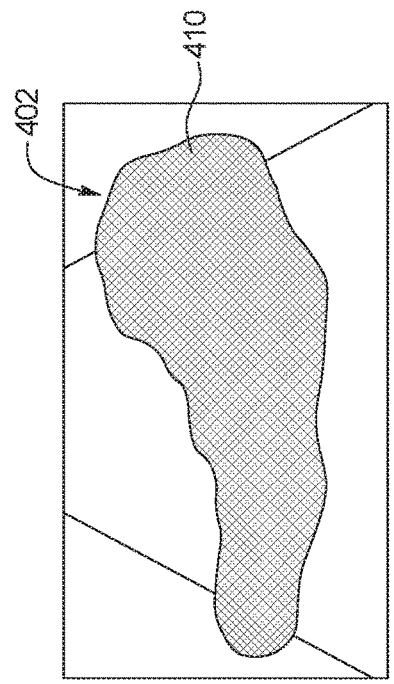
Figure 4C:
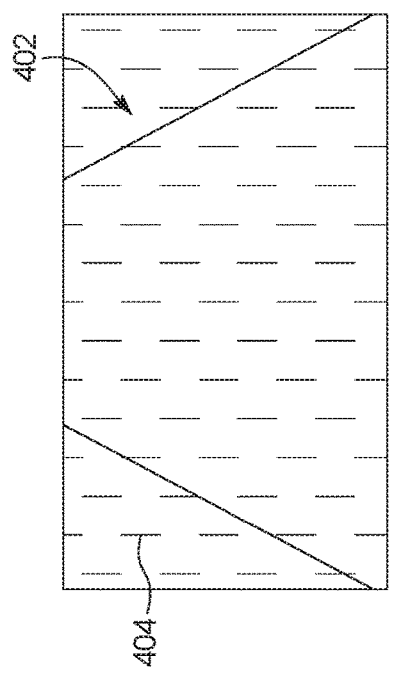
Figure 4D:
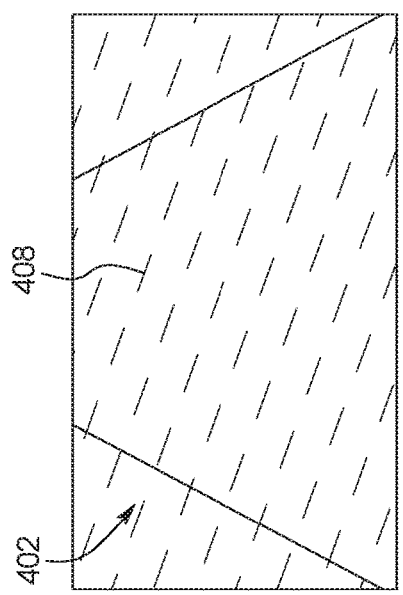

FIG. 4A-4D depict example weather conditions in which the vehicle of FIG. 1 is configured to travel. More specifically, FIG. 4A illustrates precipitation 402 (e.g., rain, snow, fog, freezing rain, hail, etc.) having a vertical flow-stream 404, FIG. 4B illustrates the precipitation 402 having a parallel flow-stream 406 relative to a direction-of-travel of the vehicle 100, FIG. 4C illustrates the precipitation 402 having a cross-wind flow-stream 408 relative to the direction-of-travel of the vehicle 100, and FIG. 4D illustrates when the precipitation 402 is fog 410.

In FIG. 4A, the precipitation 402 has the vertical flow-stream 404 that is substantially perpendicular to the ground surface along which the vehicle 100 travels. The headlamp controller 132 is configured to detect when the precipitation 402 is traveling along the vertical flow-stream 404. Further, to increase the visibility of the road for the operator of the vehicle 100, the headlamp controller 132 is configured to control the high-beam lamps 112 based on the angle-of-incidence that corresponds with the vertical flow-stream 404. For example, when the precipitation 402 has the vertical flow-stream 404, the angle-of-incidence between the high beams 304 emitted by the high-beam lamps 112 and the precipitation 402 potentially causes the visibility of the operator to be reduced. To increase visibility for the operator in low ambient light conditions, the headlamp controller 132 sets the high-beam lamps 112 in an inactive mode (e.g., turns off the high-beam lamps 112) in response to detecting the vertical flow-stream 404 of the precipitation 402.

In FIG. 4B, the precipitation 402 has the parallel flow-stream 406 relative to the vehicle 100. For example, precipitation 402 has the parallel flow-stream 406 when the vehicle 100 is travelling in the same or opposite direction as that of the parallel flow-stream 406. The headlamp controller 132 is configured to detect when the precipitation 402 is traveling along the parallel flow-stream 406. Further, to increase the visibility of the road for the operator of the vehicle 100, the headlamp controller 132 is configured to control the high-beam lamps 112 based on the angle-of-incidence that corresponds with the parallel flow-stream 406. For example, when the precipitation 402 has the parallel flow-stream 406, the angle-of-incidence between the high beams 304 emitted by the high-beam lamps 112 and the precipitation 402 potentially causes the visibility of the operator to be reduced. To increase visibility for the operator in low ambient light conditions, the headlamp controller 132 sets the high-beam lamps 112 in the inactive mode (e.g., turns off the high-beam lamps 112) in response to detecting the parallel flow-stream 406 of the precipitation 402.

In FIG. 4C, the precipitation 402 has the cross-wind flow-stream 408 relative to the vehicle 100. For example, the precipitation 402 has the cross-wind flow-stream 408 when the precipitation 402 is travelling in a left-to-right and/or a right-to-left direction relative to the direction-of-travel of the vehicle. That is, the precipitation 402 travels along the cross-wind flow-stream 408 when there is a cross wind relative to the direction-of-travel of the vehicle 100. The headlamp controller 132 is configured to detect when the precipitation 402 is traveling along the cross-wind flow-stream 408. Further, the headlamp controller 132 is configured to detect a relative angle between a direction of the cross-wind flow-stream 408 and the direction-of-travel of the vehicle 100. To increase the visibility of the road for the operator of the vehicle 100, the headlamp controller 132 is configured to control the high-beam lamps 112 based on the angle-of-incidence that corresponds with the cross-wind flow-stream 408. For example, when the precipitation 402 has the cross-wind flow-stream 408, the angle-of-incidence between the high beams 304 emitted by the high-beam lamps 112 and the precipitation 402 potentially causes the visibility of the operator to be reduced. To increase visibility for the operator, the headlamp controller 132 (1) sets the high-beam lamps 112 in an active mode (e.g., turns on the high-beam lamps 112) and (2) adjusts the high-beam lamps 112 to emit the high beams 304 in angled direction in response to detecting the cross-wind flow-stream 408 of the precipitation 402. For example, in response to detecting that the precipitation 402 is travelling along the cross-wind flow-stream 408 corresponds in a left-to-right direction, the headlamp controller 132 causes the high-beam lamps 112 to emit the high beams 304 in a leftward direction. In response to detecting that the precipitation 402 is travelling along the cross-wind flow-stream 408 corresponds in a right-to-left direction, the headlamp controller 132 causes the high-beam lamps 112 to emit the high beams 304 in a rightward direction. The headlamp controller 132 adjusts the direction in which the high beams 304 are emitted based on the angle-of-incidence between the precipitation 402 and the light emitted by the high beams 304. That is, the headlamp controller 132 rotates the high beams based on the relative angle between the cross-wind flow-stream 408 and the direction-of-travel of the vehicle 100 to increase visibility of the operator of the vehicle 100 in low ambient light conditions.

In FIG. 4D, the precipitation 402 is the fog 410. The headlamp controller 132 is configured to detect when the vehicle 100 is travelling through the fog 410. Upon detecting the fog 410, the headlamp controller 132 monitors for a clear line-of-sight within the fog 410. For example, the headlamp controller 132 is configured to identify a clear line-of-sight within the fog 410 based on image(s) and/or video captured by the exterior camera 114. In response to detecting a clear line-of-sight within the fog 410, the headlamp controller 132 adjusts the high-beam lamps 112 to emit the high beams 304 in the direction of the clear line-of-sight to increase visibility for the operator when the vehicle is traveling through the fog 410 in low ambient light conditions. Similarly, the headlamp controller 132 is configured to identify a clear line-of-sight and cause the high beams 304 to be emitted in a direction of the clear line-of-sight when the vehicle 100 is travelling through smoke, dust, and/or other particulates that potentially obstruct visibility.

Figure 5:
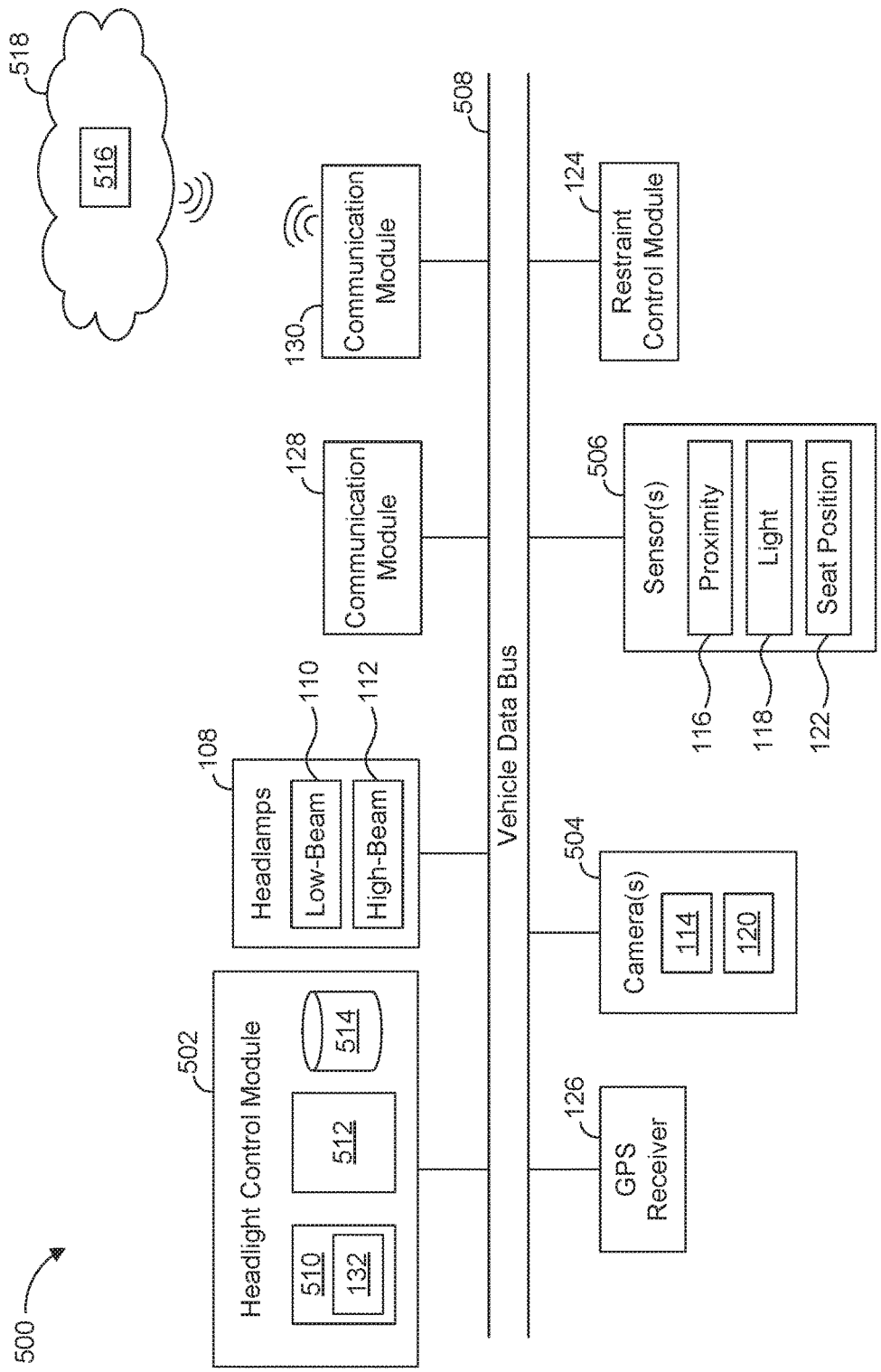
FIG. 5 is a block diagram of electronic components of the vehicle of FIG. 1.

FIG. 5 is a block diagram of electronic components 500 of the vehicle 100. As illustrated in FIG. 5, the electronic components 500 include a headlight control module 502 (also referred to as an HCM), the GPS receiver 126, the communication module 128, the communication module 130, cameras 504, sensors 506, the restraint control module 124.

The headlight control module 502 is an electronic control unit that controls operation of the headlamps 108. The headlight control module 502 includes a processor 510 (also referred to as a microcontroller unit and a controller), memory 512, and a database 514. In the illustrated example, the processor 510 of the headlight control module 502 is structured to include the headlamp controller 132. In other examples, the headlamp controller 132 is incorporated into another ECU with its own processor, memory, and/or database. The database 514 is configured to include route history of the vehicle 100 and/or a particular operator of the vehicle 100 to enable headlamp controller 132 to identify a predicted travel route based on a current location of the vehicle 100, a time of day, a day of the week, etc.

The processor 510 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 512 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 512 includes multiple kinds of memory, particularly volatile memory and non-volatile memory.

The memory 512 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 512, the computer readable medium, and/or within the processor 510 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the communication module 128 is a DSRC module that is configured to collect weather, light, and/or other data via V2V, V2X, and/or V2I communication. Further, the communication module 130 of the illustrated example is configured to wirelessly communicate with a remote server 516 via an external network 518. For example, the remote server 516 includes a remote weather server from which the communication module 130 obtains the current weather conditions for a current location of the vehicle 100 (e.g., as determined by the GPS receiver 126).

The cameras 504 collect image(s) and/or video of area(s) within and/or surrounding the vehicle 100. In the illustrated example, the cameras 504 include exterior camera 114 that is configured to capture image(s) and/or video of the area in front and/or to the side of the vehicle 100. For example, the image(s) and/or video captured by the exterior camera 114 enable the headlamp controller 132 to identify an ambient light level, a weather condition, an angle-of-incidence for light emitted by the headlamps 108, etc. Further, the cameras 504 of the illustrated example include the interior camera 120 that is configured to capture image(s) and/or video of the cabin 104 of the vehicle 100. For example, the image(s) and/or video captured by the interior camera 120 enable the headlamp controller 132 to identify a line-of-sight of the operator of the vehicle 100.

The sensors 506 are arranged in and/or around the vehicle 100 to monitor properties of the vehicle 100 and/or an environment in which the vehicle 100 is located. One or more of the sensors 506 may be mounted to measure properties around an exterior of the vehicle 100. Additionally or alternatively, one or more of the sensors 506 may be mounted inside a cabin of the vehicle 100 or in a body of the vehicle 100 (e.g., an engine compartment, wheel wells, etc.) to measure properties in an interior of the vehicle 100. For example, the sensors 506 include accelerometers, odometers, tachometers, pitch and yaw sensors, wheel speed sensors, microphones, tire pressure sensors, biometric sensors and/or sensors of any other suitable type.

In the illustrated example, the sensors 506 include the proximity sensor 116, the light sensor 118, and the seat position sensor 122. For example, the proximity sensor is configured to collect data that enables the detection, location, and/or identification of object(s) near the vehicle 100 (e.g., precipitation, smoke, pedestrians, other vehicles, etc.). The light sensor 118 is configured to measure an ambient light level of the ambient light surrounding the vehicle 100. Further, the seat position sensor 122 is configured to detect a position of the driver's seat to enable the headlamp controller 132 to identify the line-of-sight of the operator of the vehicle 100.

The vehicle data bus 508 communicatively couples the headlamps 108, the restraint control module 124, the GPS receiver 126, the communication module 128, the communication module 130, the headlight control module 502, the cameras 504, and the sensors 506. In some examples, the vehicle data bus 508 includes one or more data buses. The vehicle data bus 508 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
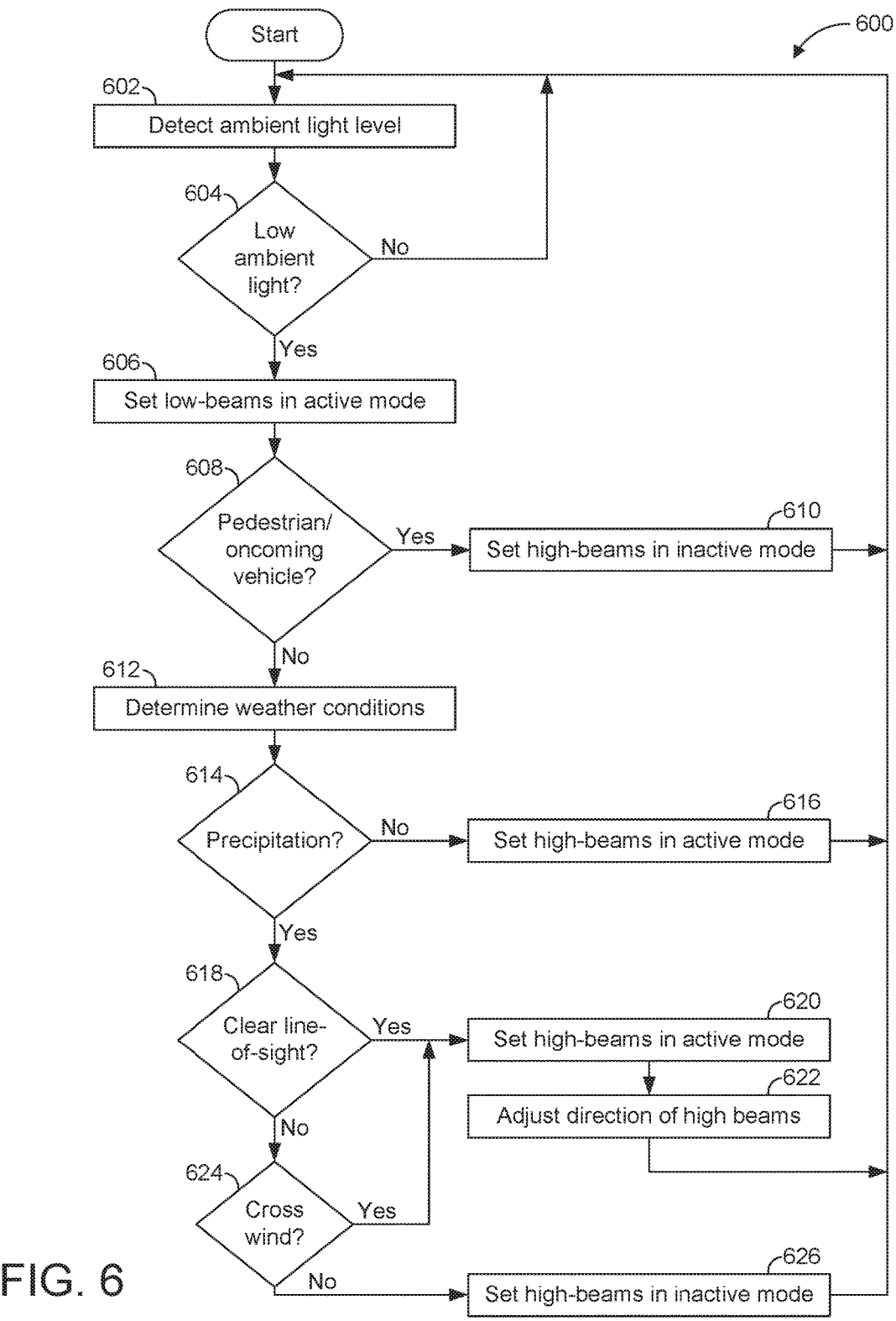
FIG. 6 is a flowchart for adjusting high-beam lamps of a vehicle based on a weather condition in accordance with the teachings herein.

FIG. 6 is a flowchart of an example method 600 to adjust headlamps of a vehicle based on weather conditions. The flowchart of FIG. 6 is representative of machine readable instructions that are stored in memory (such as the memory 512 of FIG. 5) and include one or more programs which, when executed by a processor (such as the processor 510 of FIG. 5), cause the vehicle 100 to implement the example headlamp controller 132 of FIGS. 1 and 4. While the example program is described with reference to the flowchart illustrated in FIG. 6, many other methods of implementing the example headlamp controller 132 may alternatively be used. For example, the order of execution of the blocks may be rearranged, changed, eliminated, and/or combined to perform the method 600. Further, because the method 1-5 is disclosed in connection with the components of FIGS. 1-5, some functions of those components will not be described in detail below.

Initially, at block 602, the headlamp controller 132 detects an ambient light level for the vehicle 100. At block 604, the headlamp controller 132 determines whether there is low ambient light. For example, the headlamp controller 132 determines that there is low ambient light when the measured ambient light level is less than a predetermined threshold. In response to the headlamp controller 132 determining that there is not low ambient light, the method 600 returns to block 602. Otherwise, in response to the headlamp controller 132 determining that there is low ambient light, the method 600 proceeds to block 606 at which the headlamp controller 132 sets the low-beam lamps 110 in active mode (e.g., the headlamp controller 132 turns on the low-beam lamps 110).

At block 608, the headlamp controller 132 determines whether there is a nearby pedestrian and/or an oncoming vehicle. In response to the headlamp controller 132 determining that there is a nearby pedestrian and/or an oncoming vehicle, the method 600 proceeds to block 610 at which the headlamp controller 132 sets the high-beam lamps 112 in inactive mode (e.g., the headlamp controller 132 turns off the high-beam lamps 112). Otherwise, in response to the headlamp controller 132 determining that there is a nearby pedestrian and/or an oncoming vehicle, the method 600 proceeds to block 612 at which the headlamp controller 132 identifies the weather conditions for the vehicle location.

At block 614, the headlamp controller 132 determines whether the weather condition includes precipitation, smoke, and/or any other particulates that potentially obstruct visibility in low-light conditions. In response to the headlamp controller 132 determining that the weather condition does not include precipitation and/or visibility-reducing particulates, the method 600 proceeds to block 616 at which the headlamp controller 132 sets the high-beam lamps 112 in active mode (e.g., the headlamp controller 132 turns on the high-beam lamps 112). Otherwise, in response to the headlamp controller 132 determining that the weather condition includes precipitation and/or visibility-reducing particulates, the method 600 proceeds to block 618.

At block 618, the headlamp controller 132 determines whether there is a clear line-of-sight through the precipitation and/or air particulates for the operator. In response to the headlamp controller 132 determining that there is a clear line-of-sight, the method 600 proceeds to block 620 at which the headlamp controller 132 sets the high-beam lamps 112 in active mode (e.g., the headlamp controller 132 turns on the high-beam lamps 112). Further, at block 622, the headlamp controller 132 adjusts the high-beam lamps 112 to emit the high beams 304 in a direction toward the clear line-of-sight.

Returning to block 618, the method 600 proceeds to block 624 in response to the headlamp controller 132 determining that there is not a clear line-of-sight. At block 624, the headlamp controller 132 determines whether there is a cross wind relative to the direction in which the vehicle 100 is travelling. In response to the headlamp controller 132 determining that there is a cross wind of the precipitation and/or other air particulates, the method 600 proceeds to block 620 at which the headlamp controller 132 sets the high-beam lamps 112 in active mode (e.g., the headlamp controller 132 turns on the high-beam lamps 112). Further, at block 622, the headlamp controller 132 adjusts a direction in which the high-beam lamps 112 emit the high beams 304 based on the angle-of-incidence with the precipitation and/or air particulates that corresponds with the direction of the cross wind.

Returning to block 624, the method 600 proceeds to block 626 in response to the headlamp controller 132 determining that there is not a cross wind. For example, the headlamp controller 132 determines that there is not a cross wind if the precipitation has a vertical flow-stream and/or a flow-stream that is parallel to the direction of travel of the vehicle 100. At block 626, the headlamp controller 132 sets the high-beam lamps 112 in inactive mode (e.g., the headlamp controller 132 turns off the high-beam lamps 112).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the term "module" refers to hardware with circuitry to provide communication, control and/or monitoring capabilities. A "module" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   headlamps including low-beam lamps and high-beam lamps;
   a light sensor;
   a camera; and
   a controller to:
      set the low-beam lamps in active mode when the light sensor detects low ambient light;
      monitor for precipitation in the low ambient light via the camera;
      identify an angle-of-incidence (AOI) between the precipitation and light emitted by the headlamps, wherein the controller utilizes image recognition to identify the AOI based on an image captured by the camera; and
      control the high-beam lamps based on the AOI.

2. The vehicle of claim 1, wherein the controller is to:
   monitor for smoke in the low ambient light via the camera; and
   identify the AOI between the smoke and the light emitted by the headlamps.

3. The vehicle of claim 1, wherein, to control the high-beam lamps based on the AOI, the controller is to set the low-beam lamps in inactive mode responsive to detecting a precipitation flow-stream that is perpendicular or parallel to the light emitted by the headlamps.

4. The vehicle of claim 1, wherein, to control the high-beam lamps based on the AOI, the controller is to adjust the high-beam lamps to emit high beams in a direction of a precipitation flow-stream that corresponds with cross wind.

5. The vehicle of claim 1, wherein the controller is to:
identify a clear line-of-sight within the precipitation based on the image captured by the camera; and
cause the high-beam lamps to emit high beams in a direction of the clear line-of-sight.

6. The vehicle of claim 1, wherein the controller is to:
detect at least one of a nearby pedestrian and an oncoming vehicle based on at least one of the camera and a proximity sensor; and
set the low-beam lamps in inactive mode responsive to detecting the at least one of the nearby pedestrian and the oncoming vehicle.

7. The vehicle of claim 1, wherein the controller is to:
detect a line-of-sight of a vehicle operator; and
control the high-beam lamps based on the line-of-sight of the vehicle operator.

8. The vehicle of claim 7, wherein the controller is configured to detect the line-of-sight via at least one of an interior camera, a seat position sensor, and a restraint control module.

9. The vehicle of claim 1, wherein each of the high-beam lamps includes a plurality of LEDs and the controller adjusts which of the plurality of LEDs are active to adjust a direction in which the high-beam lamps emit high beams.

10. The vehicle of claim 1, wherein each of the high-beam lamps includes a rotatable frame and the controller rotates the rotatable frame to adjust a direction in which the high-beam lamps emit high beams.

11. A vehicle comprising:
headlamps including low-beam lamps and high-beam lamps;
a communication module; and
a controller to:
set the low-beam lamps in active mode responsive to detecting low ambient light via the communication module;
monitor for precipitation in the low ambient light via the communication module;
identify an angle-of-incidence (AOI) between the precipitation and light emitted by the headlamps based on a direction-of-travel of the vehicle and a wind direction collected via the communication module; and
control the high-beam lamps based on the AOI.

12. The vehicle of claim 11, wherein the communication module includes a dedicated short-range communication module.

13. The vehicle of claim 11, further including a GPS receiver to identify a current vehicle location.

14. The vehicle of claim 13, wherein the communication module is to obtain weather conditions for the current vehicle location from a remote weather service.

15. The vehicle of claim 14, wherein the controller is to identify a predicted travel route based at least partially on the current vehicle location and the communication module is to obtain weather conditions for the predicted travel route from the remote weather service.

16. The vehicle of claim 11, wherein, to control the high-beam lamps based on the AOI, the controller is to set the low-beam lamps in inactive mode responsive to detecting a precipitation flow-stream that is perpendicular or parallel to the light emitted by the headlamps.

17. The vehicle of claim 11, wherein, to control the high-beam lamps based on the AOI, the controller is to adjust the high-beam lamps to emit high beams in a direction of a precipitation flow-stream that corresponds with cross wind.

18. A method comprising:
detecting, via a light sensor, an ambient light level of a vehicle;
setting low-beam lamps of headlamps in active mode when the light sensor detects low ambient light;
monitoring, via a camera, for precipitation in the low ambient light;
identifying, via a processor utilizing image recognition, an angle-of-incidence (AOI) between the precipitation and light emitted by the headlamps based on an image captured by the camera; and
controlling, via the processor, high-beam lamps of the headlamps based on the AOI.

\* \* \* \* \*